US007141268B2

(12) United States Patent
Hamada

(10) Patent No.: US 7,141,268 B2
(45) Date of Patent: Nov. 28, 2006

(54) WATERY RICE GRUEL AND PRODUCTION METHOD THEREOF

(76) Inventor: Satoko Hamada, 21-1, Ohyama-cho, Ohkamedani, Fukakusa, Fushimi-ku, Kyoto-shi, Kyoto-fu (JP)

( * ) Notice: Subject to any disclaimer, the term of this patent is extended or adjusted under 35 U.S.C. 154(b) by 560 days.

(21) Appl. No.: 10/430,048

(22) Filed: May 6, 2003

(65) Prior Publication Data

US 2004/0224078 A1  Nov. 11, 2004

(51) Int. Cl.
*A23L 1/28* (2006.01)
(52) U.S. Cl. .................. 426/655; 426/618; 426/589
(58) Field of Classification Search ................ 426/655, 426/618, 589
See application file for complete search history.

(56) References Cited

FOREIGN PATENT DOCUMENTS

| JP | 58224649 A | * | 12/1983 |
| JP | 59082059 A | * | 5/1984 |
| JP | 63/276454 | * | 11/1988 |
| JP | 2002125604 | * | 5/2002 |
| JP | 2002218928 A | * | 8/2002 |

OTHER PUBLICATIONS

Patent Abstracts of Japan, Publication No. 04-063557, Feb. 28, 1992 of JP 02-173833, Jun. 30, 1990, Eiko et al., "Unpolished Rice Gruel and Production Thereof".
Patent Abstracts of Japan, Publication No. 02-076545, Mar. 15, 1990 of JP 63-229642, Sep. 13, 1988, Hasebe Kaoru, "Health Food composed Mainly of Gelatinized Whole Rice Four and Preparation Threof".
Patent Abstracts of Japan, Publication No. 02-265450, Oct. 30, 1990 of JP 01-083993, Apr. 4, 1989, Minamototoyoyuki:KK, "'Okowa' Made from Black-Colored Rice".
Patent Abstracts of Japan, Publication No. 03-175950, Jul. 31, 1991 of JP 01-313157, Dec. 1, 1989, Ajinomoto Co. Inc., "Production of Coicis Semen-Containing Food".

* cited by examiner

*Primary Examiner*—Anthony Weier
(74) *Attorney, Agent, or Firm*—Frishauf, Holtz, Goodman & Chick, P.C.

(57) ABSTRACT

A watery rice gruel and a production method of a watery rice gruel, which can be taken even by patients such as cancer patients who have experienced an extreme loss of appetite, stimulate the hypothalamus in the brains of these patients and enhance their appetite as well as keeping the physical homeostasis of these patients normal.

By placing dark-roasted unpolished rice 4, black rice 6 and adlay 7 in water 9 and boiling, the bitter taste and rich aroma of the dark-roasted unpolished rice 4 is imparted to the watery rice gruel obtained by boiling. The water rice gruel promotes intestinal movement in the patient, while the rich aromatic component dissolved into the watery rice gruel promotes the discharge of gas that has accumulated in the stomach and intestinal tract of the patient, thereby eliminating the feeling of distention of the stomach and intestines.

11 Claims, 6 Drawing Sheets

(a)

Black rice 6   Adlay 7   Dark-roasted unpolished rice 4

| Analyzed item | Results | Note | Analytical Method |
|---|---|---|---|
| Water | 93.6g/100g | 1 | Vacuum heating and drying method |
| Protein | 0.1g/100g | | Kjeldahl method |
| Lipid | 0.1g/100g | | Soxhlet extraction |
| Ash | 0.2g/100g | | Direct flame method |
| Carbohydrate | 6.0g/100g | 2 | |
| Energy | 25Kcal/100g | 3 | |
| Sodium | 57.1mg/100g | | Atomic absorption spectrophotometry |
| Phosphorus | 15.4mg/100g | | Vanad-molybdic acid absorption spectrophotometry |
| Calcium | 1.4mg/100g | | Atomic absorption spectrophotometry |
| Potassium | 29.3mg/100g | | Atomic absorption spectrophotometry |
| Magnesium | 2.4mg/100g | | Atomic absorption spectrophotometry |
| Thiamin (vitamin $B_1$) | 0.01mg/100g | 4 | High-performance liquid Chromatography |
| Vitamin $B_6$ | 16μg/100g | 5 | Microbiological assay |
| Starch | 4.5g/100g | 6 | Enzymatic method |
| Dextrin | 4.91g/100t | 7 | Enzymatic method |
| Copper | 10μg/100g | | Atomic absorption spectrophotometry |
| Zinc | 51μg/100g | | Atomic absorption spectrophotometry |
| Manganese | 66μg/100g | | Atomic absorption spectrophotometry |

1: Nitrogen-protein conversion coefficient: 6.25
2: Calculation formula: 100 - (water + protein + lipid + ash)
3: Energy conversion coefficient according to Nutrient Labeling Standards (Ministry of Health and Welfare Notification No. 146, 1996): Protein 4, lipids 9, carbohydrates 4
4: As thiamine hydrochloride
5: Bacterial strain used: *Saccharomyces cerevisiae* (*S. uvarum*) ATCC 9080
6: Value obtained by treating sample insoluble in 50% ethanol with glucoamylase (pH 4.8, 40°C, 3 hours) followed by measuring glucose level and multiplying by 0.9
7: Value obtained by treating portion of cold-water extract insoluble in 90% ethanol with glucoamylase (pH 4.8, 40°C, 3 hours) followed by measuring glucose level and multiplying by 0.9

Fig. 5

| Tested item | Content in 100 g of watery rice gruel made from polished rice | Content in 100 g of watery rice gruel according to the embodiment |
|---|---|---|
| Water | 93.5 g | 93.6 g |
| Protein | 0.5 g | 0.1 g |
| Lipid | 0.1 g | 0.1 g |
| Carbohydrates | 5.9 g | 6.0 g |
| Ash | 0 g | 0.2 g |
| Calcium | 0 mg | 1.4 mg |
| Phosphorous | 0 mg | 15.4 mg |
| Iron | 0 mg | 0 mg |
| Sodium | 2 mg | 57.1 mg |
| Potassium | 5 mg | 29.3 mg |
| Vitamin $B_1$ | 0.01 mg | 0.01 mg |
| Vitamin $B_6$ | 0 µg | 16 µg |

(Source: Japan Food Analysis Center)

Fig. 6

| Test date | 9/5 | 9/12 | 9/14 |
|---|---|---|---|
| White blood cell count (µl) | 900 | 3,000 | 8,200 |

Note: Normal range of white blood cell count: 3900-8900 (µl)

Fig. 7

| Analyzed item | Result | Detection limit | Note | Analytical method |
|---|---|---|---|---|
| Arsenic (as $As_2O_3$) | Not detected | 0.1 ppm | | DDTC·Ag absorption spectrophotometry |
| Heavy metal (as Pb) | Not detected | 1 ppm | | Sodium sulfide colorimetry |
| BHC | Not detected | 0.02 ppm | | Gas chromatography |
| DDT | Not detected | 0.02 ppm | | Gas chromatography |
| PCB | Not detected | 0.01 ppm | | Gas chromatography |
| Ordinary flora (live bacteria count) | less than 300/g | | | Standard agar plate culturing method |
| E. coli group | Negativity/ 2.22g | | | BGLB method |

WATERY RICE GRUEL AND PRODUCTION METHOD THEREOF

BACKGROUND OF THE INVENTION

1. Field of the Invention

The present invention relates to a watery rice gruel used as an invalid diet for patients such as terminal cancer patients who have lost their appetite as a result of having became debilitated.

2. Background Art

Patients such as terminal cancer patients who are in a is debilitated state conventionally lose their appetite and are unable to eat. In such cases, the physician provides supplementary calories and nutrients for the bodies of these patients by using one of the two methods indicated below. The first method involve tube feeding, namely inserting a tube through the nose of the patient to the stomach and injecting a high calorie liquid diet or nutrient solution through that tube. Further, the second method involves intravenous hyperalimentation (IVH), namely performing venipuncture on the patient's subclavian vein or femoral vein, implanting a catheter (tubular device used for diagnosis and treatment of illnesses by inserting into the urethra or urinary bladder) in the superior vena cava or inferior vena cava, and transfusing a high-calorie liquid through this catheter, In addition, in the field of invalid diets used for elderly patients and so forth, a rice porridge is known that is easily consumed by critically ill patients having decreased chewing and swallowing functions by coagulating or thickening watery rice gruel with at least one of either a coagulant or thickener, and mixing with grains of rice to gel the entire porridge containing grains of rice and watery rice gruel (see, for example, Japanese Provisional Patent Publication No. 187832/1999).

However, in the case of supplying calories and nutrients to the patient's body using conventional methods such as tube feeding or intravenous hyperalimentation as described above, the patient ends up losing the desire to live. This is because the acts of eating and tasting are intimately related to appetite, and are linked to a feeling of pleasure as a result of stimulating the hypothalamus (vital center) and bringing about a desire to live within the patient. Thus, in the case of the artificial feeding methods as described above which are unaccompanied by the acts of eating and tasting, the fundamental desires and pleasures of human beings end up being blocked. In addition, since methods of feeding patients by tube feeding as described above cause considerable pain and discomfort for the patient, nearly all patients attempt to pull out the tube. Thus, it becomes necessary to restrain both hands of the patient with rope and so forth to prevent the patient from pulling out the tube, resulting in the problem of the patient's human dignity being lost. In addition, in the case of feeding methods for patients by intravenous hyperalimentation, although the frequency at which patients pull out the tube is lower as compared with the case of tube feeding methods, even in this case, the patient is unable to escape the sense of being restrained (as a result of being connected to the catheter). Moreover, since nutrients are administered directly into the blood vessels of the patient in the case of intravenous hyperalimentation, the patient's digestive tract does not function. As a result, the normal flora of the intestine, which are referred to as the first line of defense (immunity) of the patient as well as the intestinal liver, end up being depleted, thereby leading to a decline in the patient's bodily functions and creating the problem of having a serious effect on the patient's physical homeostasis.

In addition, the rice porridge indicated in the previously mentioned Japanese Provisional Patent Publication No. 187832/1999, in which an entire rice porridge, containing grains of rice and watery rice gruel, was gelled cannot be fed to patients who no longer accept food. In addition, although this rice porridge is effective in supplying patients with nutrients, it does not have the effect of improving the patient's condition.

SUMMARY OF THE INVENTION

In order to solve the above problems, an object of the present invention is to provide a watery rice gruel and its production method which, together with being able to maintain a patient's appetite and other desires by stimulating the patient's hypothalamus so that even patients such as terminal cancer patients who have experienced an extreme loss of appetite are able to eat enables the homeostasis system of the patient's body to function normally. In addition, an object of the present invention is to provide a watery rice gruel and its production method that is capable of improving the condition of cancer patient's, while also being able to restore the patient's white blood cell count to a normal value in the case the patient's white blood cell count has dramatically decreased due to administration of a carcinostatic.

In order to achieve the above objects, the present invention is comprised of a liquid obtained by placing dark-roasted unpolished rice, obtained by roasting unpolished rice over a flame, black rice and adlay in water and boiling.

In the above constitution, as a result of placing the dark-roasted unpolished rice obtained by roasting unpolished rice over a flame in water along with black rice and adlay followed by boiling, the bitter taste and rich aroma of the dark-roasted unpolished rice obtained by boiling can be imparted to the watery rice gruel. As a result, in the case of administering this watery rice gruel to a patient, the bitter taste dissolved in the watery rice gruel from the dark-roasted unpolished rice reflexively stimulates the vital center in the patient's hypothalamus through the sensation of the patient's tongue, and this stimulation promotes the secretion of gastric juices and other digestive juices by way of parasympathetic nerves, thereby making it possible to promote movement of the digestive tract. In addition, the rich aromatic component dissolved in the watery rice gruel from the dark-roasted unpolished rice functions as an aromatic stomachic (aromatic digestive) or food spice (aromatic food), promoting the discharge of gas accumulated in the stomach and intestinal tract, and eliminating the feeling of distention of the stomach and intestines. Since the rich aromatic component in the watery rice gruel also enters the patient's mouth, differing from fragrant spices (or so-called perfumes) that only impart a sense of smell, the patient is also able to enjoy the aroma that penetrates from the patient's mouth to the nose, thereby enhancing the action of eliminating the feeling of distention. Since the appetite of a patient administered this watery rice gruel can be enhanced due to the above promotional function on digestive tract movement and function that eliminates the feeling of distention, this watery rice gruel can be eaten even by patients such as terminal cancer patients who have experienced an extreme loss of appetite. Since this watery rice gruel is composed of raw ingredients consisting of black rice, which contains anthocyanin-based pigment (polyphenol) having carcinostatic effects, adlay, which has diuretic effects and the effect of eliminating edema accompanying cancer and so forth (state in which large amounts of lymph and serum have accumulated in the interstitial space and body cavities of the body), and dark-roasted unpolished rice, which has both antioxidative and antipyretic action, it is able to improve the various symptoms of terminal cancer patients in particular. Moreover, differing from watery rice gruel made from ordinary polished rice, since this watery rice gruel contains trace nutrients such as zinc, iron and copper, it is able to increase the white blood cell counts of patients in which white blood cell counts have decreased dramatically due to administration of carcinostatics.

In addition, the ratios of dark-roasted unpolished rice, black rice and adlay to water should each be made to be 1% by weight to 20% by weight. As a result, the actions described in claim 1 can be reliably obtained.

Further, the invention of claim 3 is a production method of watery rice gruel comprising placing dark-roasted unpolished rice, obtained by roasting unpolished rice over a flame, black rice and adlay in water and boiling, and filtering the liquid obtained by this boiling or taking the supernatant of the liquid. The actions of claim 1 can be obtained from watery rice gruel produced using this method.

In addition, the ratios of the above dark-roasted unpolished rice, black rice and adlay to water prior to boiling should each be made to be 1% by weight to 20% by weight. Actions similar to those described above can be obtained from watery rice gruel produced using this method.

BRIEF DESCRIPTION OF THE DRAWINGS

FIG. 4 is a drawing the results of a componential analysis of the above watery rice gruel.

FIG. 5 is a drawing showing the results of comparing the components of the above watery rice gruel with the components of watery rice gruel using only polished rice.

FIG. 6 is a drawing showing an example of the changes in white blood cell counts in the case of continuously feeding the above watery rice gruel to patients having decreased white blood cell counts.

FIG. 7 is a drawing showing the results of a toxicity analysis of the above watery rice gruel.

DESCRIPTION OF THE PREFERRED EMBODIMENTS

Figure 1:
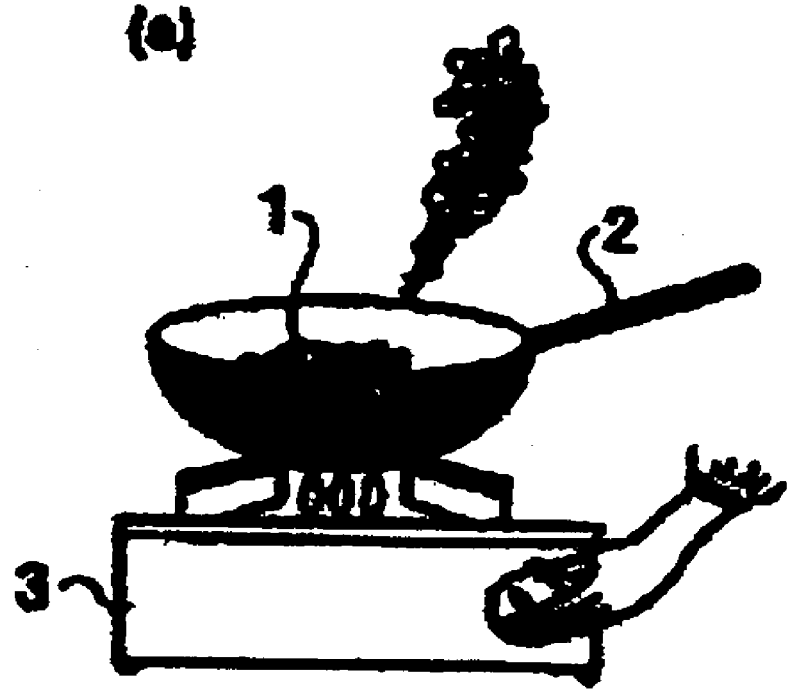
FIG. 1(*a*) is a drawing showing the manner of roasting dark-roasted unpolished rice used as a raw material of the watery rice gruel according to one embodiment of the present invention, while FIG. 1(*b*) is a drawing showing the method for confirming that the above dark-roasted unpolished rice is finished being roasted.
Figure 1:
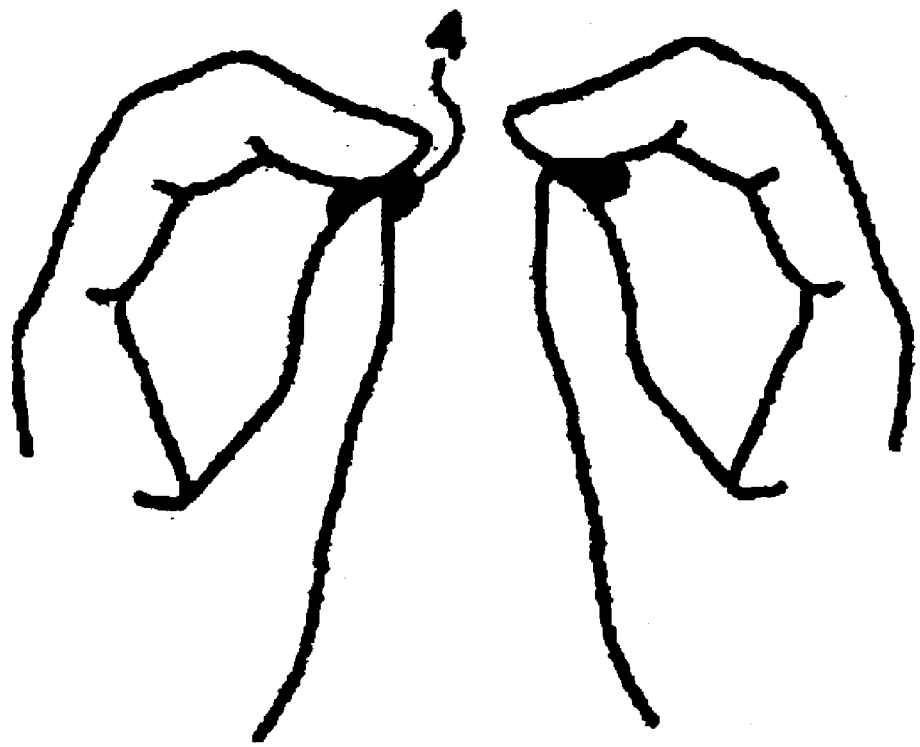

The following provides an explanation of the watery rice gruel and production method of a watery rice gruel according to an embodiment of the present invention with reference to the drawings. First, with reference to FIGS. 1(*a*) and 1(*b*), an explanation is provided of an example of a production method of the dark-roasted unpolished rice (unpolished rice roasted over a flame) that is used as a raw material of the watery rice gruel according to an embodiment of the present invention. First, as shown in FIG. 1(*a*), unpolished rice 1 is placed in a fry pan 2, and roasted over a medium to somewhat low flame with a gas burner 3. After continuing to roast for about 1 hour, as shown in FIG. 1(*b*), the roasted unpolished rice 4 cracks open into two pieces when pinched between the fingernails, and the crack surface has a deep, dark brown color. Once this has been able to be confirmed, the flame of gas burner 3 is turned off. This roasted unpolished rice is referred to as dark-roasted unpolished rice. Further, the dark-roasted unpolished rice can be prepared commercially by roasting unpolished rice for about 20 hours at the temperature between about 180° C. and about 200° C., preferably between about 185° C. and 190° C., more preferably about 187° C., by, e.g., far-infrared roasting.

Figure 2:
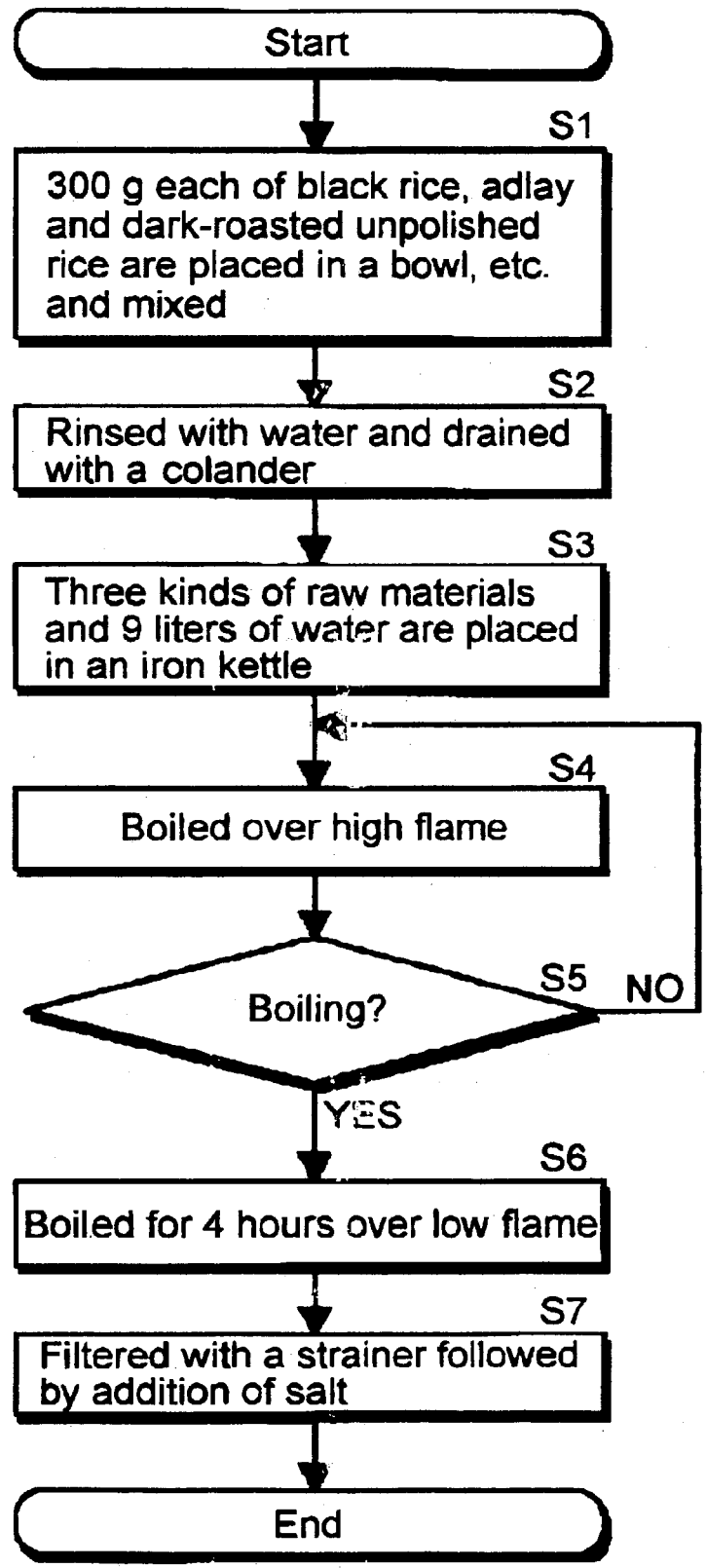
FIG. 2 is a flow chart showing treatments in the production of the above watery rice gruel.
Figure 3:
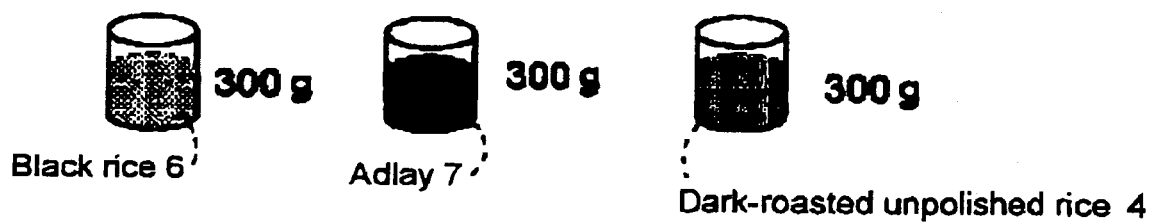
FIG. 3(*a*) is a drawing showing the raw materials of the above watery rice gruel, while FIG. 3(*b*) is a drawing depicting boiling of the above watery rice gruel.
Figure 3:
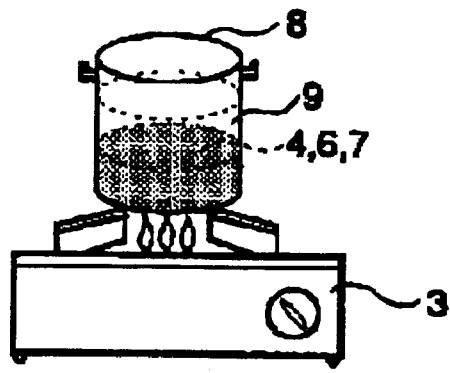

Next, with reference to the flow chart of FIG. 2 along with FIGS. 3(*a*) and 3(*b*), an explanation is provided of a production method of watery rice gruel by the above roasted unpolished rice (dark-roasted unpolished rice), black rice and adlay as its raw materials. First, as shown in FIG. 3(*a*), 300 g each of dark-roasted unpolished rice 4, black rice 6 and adlay 7 are placed in cups, and after placing in a bowl and mixing (S1), they are gently rinsed with water and then drained with a colander (S2). Next, as shown in FIG. 3(*b*), the above three kinds of materials 4, 6 and 7 10 along with 9 liters of water 9 are placed in an iron kettle 8 (S3), this iron kettle 8 is then heated over a high flame by gas burner 3 (S4). When the water inside iron kettle 8 boils (YES in S5), the strength of the flame is changed to a low flame to a degree that causes the liquid inside to circulate slightly, after which boiling is continued for about 4 hours (S6). The cooked liquid is then filtered with a strainer, and about 6 g of salt are added to the filtered liquid (S7) to complete production of the watery rice gruel. The amount of time required for the above boiling varies according to the weights of the three materials of 4, 6 and 7 as well as the amount of water 9, and for example, if 100 g each of dark-roasted unpolished rice, black rice and adlay along with 3 liters of water 9 are used, then the time required for boiling is about 3 hours.

Next, an explanation is provided of the effects of the watery rice gruel produced according to the method described above. However, before providing a detailed explanation of the effects of this watery rice gruel, an explanation is provided of the three types of functions typically possessed by foods. These three functions are primary, secondary and tertiary functions. The primary function refers to the function of food from the perspective of nutrition, and components such as proteins, lipids, carbohydrates and vitamins are responsible for this. The secondary function refers to the function from the perspective of preference, namely the delicious taste associated with foods. This brings about life force by stimulating the hypothalamus (vital center) of the person who eats the food, while also stimulating the immune system and endocrine system through the hypothalamus. The tertiary function is the function from the perspective of prevention, and substances such as antioxidants are responsible for this by preventing aging and lifestyle diseases.

Next, a discussion is provided of this watery rice gruel from the perspective of these three types of functions described above. First, when considering from the perspective of the primary function of food, as shown in the results of an analysis of the components shown in FIG. 4, this watery rice gruel is mainly composed of carbohydrates which are easily digestible, in addition to water, and since it contains small amounts of proteins and lipids, is suitable for supplying nutrients to debilitated patients Next, when considering from the perspective of the secondary function of foods, on the basis of past clinical experience, this watery rice gruel can be eaten even by debilitated patients who have not appetite and are unable to drink water. Moreover, this watery rice gruel is enjoyed by patients for its flavor and prevents patients from becoming bored with it. Moreover, when considering from the perspective of the tertiary function of foods. anthocyanin (polyphenol), which is contained in black rice 6, is dissolved in this watery rice gruel, and the antioxidative action of this anthocyanin-based pigment demonstrates the effect of eliminating excess active oxygen in the patient's body, thereby enabling it to improve the condition known as cachexia frequently observed in terminal cancer patients and patients with debilitating diseases. In addition, as shown in FIG. 4, since this watery rice gruel contains large amounts of trace nutrients such as calcium, phosphorous, zinc, copper and manganese that are required by the body, feeding this watery rice gruel to patients in which white blood cell counts have decreased due to administration of carcinostatics makes it possible to increase their white blood cell counts.

The following provides a detailed description from the perspective of the previously mentioned secondary function of foods. The reason why this watery rice gruel can be eaten even by debilitated patients who are unable to even drink water is as follows. Namely, the bitter taste and rich aromatic component of dark-roasted unpolished rice 4 are dissolved in this watery rice gruel, and this bitter taste and rich aromatic component make this watery rice gruel more easily eaten by patients. More specifically, in the case of giving this watery rice gruel to patients, the rich aromatic component dissolved in the watery rice gruel from the dark-roasted unpolished rice functions as an aromatic stomachic (aromatic digestive) or food spice (aromatic food), promoting the discharge of gas accumulated in the stomach and intestinal tract of the patient, and eliminating the feeling of distention of the stomach and intestines. Since the rich aromatic component in the watery rice gruel also enters the patient's mouth, differing from fragrant spices (or so-called perfumes) that only impart a sense of smell, the patient is also able to enjoy the aroma that penetrates from the patient's mouth to the nose, thereby enhancing the action of eliminating the feeling of distention. In addition, the bitter taste dissolved in the watery rice gruel from the dark-roasted unpolished rice reflexively stimulates the vital center in the patient's hypothalamus through the sensation of the patient's tongue, and this stimulation promotes the secretion of gastric juices and other digestive juices by way of parasympathetic nerves, thereby making it possible to promote movement of the digestive tract. Since the appetite of a patient administered this watery rice gruel can be enhanced due to the promotional function on digestive tract movement and the function that eliminates the feeling of distention, this watery rice gruel can be eaten even by patients such as terminal cancer patients and patients with debilitating diseases who have experienced an extreme loss of appetite. This act of eating stimulates the hypothalamus of the patient and functions to maintain the desire of the patient to live, and by promoting the growth of the patient's intestinal normal flora, also acts to allow the homeostasis system of the patient's body to function normally with this intestinal normal flora.

In addition, tube feeding and other conventional artificial feeding methods caused considerable suffering for patients, and required both hands of the patient to be restrained with ropes and so forth to prevent the patient from pulling out the tube, thereby resulting in the patient losing his or her dignity as a human being. In contrast, as was previously described, since this watery rice gruel can be eaten even by patients experiencing an extreme loss of appetite for whom there was not a method for providing nutrients other than the use of conventional artificial feeding methods, it has the function of maintaining the dignity of severely ill patients as human beings. Moreover, in the case of performing artificial feeding methods as described above on elderly patients, although dementia progresses rapidly, as a result of this watery rice gruel being able to be ingested orally, the desire to live of patients as previously described is maintained, thereby making it possible to prevent the progression of dementia.

The following provides a description of the results of a clinical study co determine whether or not this watery rice gruel can be given to terminal cancer patients and other debilitated patients. When this watery rice gruel was fed to five debilitated patients, more than 100 g of this watery rice gruel was able to be consumed by all five patients.

Next, a detailed description is provided of the tertiary function of food. This watery rice gruel is the result of boiling various nutrients of dark-roasted unpolished rice 4, black rice 6 and adlay 7, and exhibits the effects of these three raw materials. Thus, the effects possessed by each of these three raw materials are the effects of this watery rice gruel itself. The following provides an explanation of the respective effects of these three raw materials. First, black rice 6, which is also referred to as "long life rice" or "medicinal rice" in China, has been treated as one of the imperial foods served to emperors throughout history. According to the Chinese pharmaceutical book "Herb Encyclopedia", it is described as "black rice improves the functions of the kidneys, spleen and liver, has hematopoietic effects, has a good taste and is good for supplying nutrients to persons with weak gastrointestinal constitutions." At present, black rice 6 has been demonstrated to contain anthocyanin-based pigment (polyphenol). This anthocyanin-based pigment has superior antioxidative action and has been demonstrated to be effective in removing excess active oxygen in the body. In addition, black rice 6 also contains oryzanol, which also has antioxidative action, and selenium, the metal component of glutathione peroxidase, the most important antioxidant in the body. The antioxidative actions of these components enhance the antioxidative action of anthocyanin-based pigments. Moreover, various trace nutrients are dissolved in the above watery rice gruel from black rice 6. Black rice contains vitamin C as well as large amounts of vitamins B1, B2, B6, D and E that are lacking in ordinary polished rice, and the contents of those substances are 25–172% higher than high-grade polished rice. Among these, vitamin C prevents cancer and so forth by promoting formation of body cells and healing of wounds. In addition, vitamin B1 has remarkable effects including prevention of neuritis and beriberi, appetite enhancement and promotion of growth. Moreover, vitamin D is necessary to increase absorption and metabolism of zinc and phosphorous in the body, and promotes normal growth of teeth and bones. In addition, vitamin E is referred to as the "essence of youth", and has the action of maintaining the body's normal reproductive function while also preventing aging. In addition, black rice 6 contains 1–3 times more calcium and phosphorous than high-grade rice (among polished rice), while containing 1–5 times more iron, zinc, copper, molybdenum and manganese, etc. than ordinary polished rice. Among these, iron is a component of blood proteins and skin proteins, and plays an important role in respiration. In addition, zinc and copper are referred to as a firework of life, and are important components of various enzymes that are required for activation of enzymes.

Next, an explanation is provided regarding the effects of unpolished rice 1 that serves as the raw material of dark-roasted unpolished rice 4. Unpolished rice is referred to as "Uruchi rice" according to the Chinese Herb Encyclopedia, and is reported to have effects including "prevention of the loss of body fluids, stopping dry mouth and maintaining health when consumed on a regular basis." Since dehydration occurs frequently in a debilitated state, the effect of unpolished rice 1 is effective for this. In addition, unpolished rice 1. Similar to black rice 6, contains oryzanol, which has antioxidative action, and selenium, the metal component of glutathione peroxidase, an antioxidative enzyme. The antioxidative action of these components enhance the antioxidative action of the anthocyanin-based pigment obtained from black rice 6. In addition, as a result of roasting unpolished rice 1 to obtain dark-roasted unpolished rice 4, a detoxifying function can be imparted to dark-roasted unpolished rice 4 not found in the original unpolished rice 1. Since this detoxifying function is decreased in terminal cancer patients and other debilitated patients, the effects of dark-roasted unpolished rice 4 are effective for such patients.

Next, an explanation is provided of the effects of adlay 7. Adlay is referred to as the "Yokuinin" according to Chinese Herb Encyclopedia, and is mainly considered to be effective against edema (state in which large amounts of lymph and serum have accumulated between body tissue or in body cavities). This effect originates in the action of adlay 7 of improving the flow of blood and lymph (the fluid that fills the spaces between body tissues). Namely, the components of adlay 7 act on the patient's kidneys to promote diuresis while also removing swelling of the extremities and retention of water in the abdominal and thoracic cavities. In addition, recent research has confirmed that adlay 7 also has antitumor action, central inhibitory action (antipyretic and antispasmodic action), immune action, anti-inflammatory action and ovulation inductive action. In particular, its effect on cancers of digestive organs has recently attracted attention. This effect originates in the action of adlay 7 of improving the flow of blood and lymph through the skin, and is specifically the result of the antitumor action of coixenolide, which is contained in adlay 7.

As has been described above, since the various components of dark-roasted unpolished rice 4, black rice 6 and adlay 7 having various effects are dissolved in this watery rice gruel, it is effective for improving the condition of terminal cancer patients and patients with consumptive diseases. Namely, this watery rice gruel has the effect of improving the condition known as cachexia that is frequently observed in these patients. Cachexia is a condition that results in systemic debilitation, loss of appetite, emaciation, anemia, dehydration and edema of the eyelids and lower extremities, and is reported to be caused by various metabolic abnormalities and toxins. The function of preventing loss of body fluids of dark-roasted unpolished rice 4 and the function of curing edema of adlay 7 as described above are effective for this condition. Moreover, elucidation of the toxin that causes cachexia has been determined to be active oxygen. The anthocyanin-based pigment of black rice 6 is effective in removing this active oxygen. In this manner, the combination of dark-roasted unpolished rice 4, black rice 6 and adlay 7 is optimal for improving the state of cachexia.

The following describes the results of a clinical study assessing improvement of cachexia. When 200 g of the watery rice gruel were given continuously to multiple patients three times a day, the state of cachexia improved after about one month. This was the result of the action of adlay 7 of improving the flow of blood and lymph acting on the kidneys of the patients to promote diuresis and eliminate swelling of the patients' extremities as well as the accumulation of fluid in the abdominal and thoracic cavities.

In addition, since this watery rice gruel also contains large amounts of trace nutrients such as calcium, phosphorous, zinc, copper and manganese that are required by the body, feeding this watery rice gruel to patients in which white blood cells counts have decreased due to administration of carcinostatics is able to increase the white blood cells counts in these patients. FIG. 5 shows a comparison between the components of this watery rice gruel and the components of watery rice gruel made only from polished rice. As is shown in the drawing, this watery rice gruel contains large amounts of trace nutrients such as calcium and phosphorous as compared with watery rice gruel made only from polished rice. Furthermore, in this drawing, comparison results are only shown for major nutrients, while comparison results are not shown for nutrients only present in small amounts.

The following describes the results of a clinical study conducted to assess white blood cell proliferation results. When 200 g of the watery rice gruel were given continuously to multiple patients three times a day, although some individual differences were observed, white blood cells counts were confirmed to have increased in one to two weeks. FIG. 6 shows an example of the changes in white blood cell counts in the case of continuously feeding 200 g of the watery rice gruel three times a day to patients having decreased white blood cell counts caused by administration of carcinostatics. As shown in the drawing, in the case of these patients, white blood cell counts rapidly recovered in just 9 days after the start of consumption of the watery rice gruel.

Next, FIG. 7 is used to explain that this watery rice gruel does not contain toxic substances. Since this watery rice gruel uses dark-roasted unpolished rice 4, black rice 6 and adlay 7 which were grown without the use of agricultural chemicals, as shown in the drawing, it does not contain arsenic, DDT, PCB or other substances harmful to the human body, thereby making it suitable for consumption by debilitated patients.

The present invention is not limited to the above embodiment, and can be altered in various ways. For example, although the above embodiment illustrates the example of using 9 liters for the amount of water used for boiling and using 300 g each of the dark-roasted unpolished rice 4, black rice 6 and adlay 7 used for the raw materials, the ratios of dark-roasted unpolished rice, black rice and adlay relative to the amount of water are not limited to this example, and the amounts of dark-roasted unpolished rice, black rice and adlay are not required to be the same. In addition, although only the watery rice gruel was extracted by filtering the cooked liquid with a strainer in the above embodiment, the supernatant of the boiled liquid may also be used as watery rice gruel.

As has been described above, according to the invention of claim 1 or claim 3, by placing dark-roasted unpolished rice in water together with black rice and adlay followed by cooking so as to impart the bitter taste and rich aroma of the dark-roasted unpolished rice to the watery rice gruel, the appetites of patients who have been given the watery rice gruel can be enhanced. As a result, since this watery rice gruel can be eaten even by debilitated patients who have experienced an extreme loss of appetite and are unable to drink water, together with stimulating the patients hypothalamus and being able to maintain the various desires of the patient, it is enables the homeostasis system of the patient's body to function normally. In addition, since black rice, which has anthocyanin-based pigment having carcinostatic effects, adlay, which has diuretic effects and is effective against edema accompanying cancer and other diseases, and dark-roasted unpolished rice, which has antioxidative action and antipyretic action, are used as raw materials, this watery rice gruel is able to improve the various conditions of terminal cancer patients in particular. Moreover, differing from watery rice gruel made from ordinary polished rice, since this watery rice gruel contains zinc, is iron, copper and other trace nutrients, it is able to increase and return to normal values the white blood cell counts of cancer patients that have significantly decreased due to administration of carcinostatics, thereby enhancing the immunity and resistance of cancer patients.

In addition, by making the respective ratios to water of the dark-roasted unpolished rice, black rice and adlay 1% by weight two 20% by weight, respectively, the effects described above can be reliably obtained in the case of giving the watery rice gruel obtained by boiling the above raw materials to terminal cancer patients and other patients who have experienced an extreme loss of appetite.

What is claimed is:

1. A watery rice gruel consisting of a liquid separated from a mixture obtained by placing dark-roasted unpolished rice which is obtained by roasting unpolished rice over a flame, black rice and adlay in water and boiling.

2. A watery rice gruel according to claim 1, wherein the ratios of dark-roasted unpolished rice, black rice and adlay to water are each from 1% by weight to 20% by weight.

3. A watery rice gruel according to claim 1, wherein the dark-roasted unpolished rice is prepared commercially by roasting unpolished rice for about 20 hours at the temperature between about 180° C. and about 200° C.

4. A watery rice gruel according to claim 1, wherein the dark-roasted unpolished rice is prepared commercially by roasting unpolished rice for about 20 hours at the temperature between about 180° C. and about 200° C. by far-infrared roasting.

5. A watery rice gruel according to claim 1 for using as an invalid diet for a patient who has lost his or her appetite.

6. A method for producing a watery rice gruel of claim 1 comprising: placing dark-roasted unpolished rice which is obtained by roasting unpolished rice over a flame, black rice and adlay in water and boiling, and separating the liquid obtained by the boiling.

7. A method for producing a watery rice gruel according to claim 6, wherein the ratios of the dark-roasted unpolished rice, black rice and adlay to water prior to cooking are each from 1% by weight to 20% by weight.

8. A method for producing a watery rice gruel according to claim 6, wherein the dark-roasted unpolished rice is prepared commercially by roasting unpolished rice for about 20 hours at the temperature between about 180° C. and about 200° C.

9. A method for producing a watery rice gruel according to claim 6, wherein the dark-roasted unpolished rice is prepared commercially by roasting unpolished rice for about 20 hours at the temperature between about 180° C. and about 200° C. by far-infrared roasting.

10. A method for producing a watery rice gruel according to claim 6, wherein the liquid is separated by filtration.

11. A method for producing a watery rice gruel according to claim 6, wherein the liquid is separated by removing supernatant.

* * * * *